United States Patent
Keurulainen et al.

(10) Patent No.: US 6,198,928 B1
(45) Date of Patent: Mar. 6, 2001

(54) HANDOVER METHOD, AND A CELLULAR RADIO SYSTEM

(75) Inventors: Jere Keurulainen, Helsinki; Hannu Häkkinen; Seppo Hämäläinen, both of Espoo, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/043,012

(22) PCT Filed: Aug. 31, 1995

(86) PCT No.: PCT/FI95/00467

§ 371 Date: Mar. 2, 1998

§ 102(e) Date: Mar. 2, 1998

(87) PCT Pub. No.: WO97/08911

PCT Pub. Date: Mar. 6, 1997

(51) Int. Cl.[7] ....................................................... H04Q 7/38
(52) U.S. Cl. ............................. 455/436; 455/437; 455/442
(58) Field of Search ..................................... 455/436, 437, 455/442, 59, 86, 315, 522; 370/331; 375/200

(56) References Cited

U.S. PATENT DOCUMENTS

| | | | |
|---|---|---|---|
| 4,654,867 | * 3/1987 | Labedz et al. | 455/438 |
| 4,912,756 | * 3/1990 | Hop | 455/423 |
| 5,101,501 | * 3/1992 | Gilhousen et al. | 455/442 |
| 5,109,528 | * 4/1992 | Uddenfeldt | 455/442 |
| 5,267,261 | 11/1993 | Blakeney, II et al. | |
| 5,410,740 | * 4/1995 | Hagstrom | 455/67.1 |
| 5,487,083 | * 1/1996 | Nakajima et al. | 375/200 |
| 5,535,207 | * 7/1996 | Dupont | 370/433 |
| 5,640,414 | * 6/1997 | Blakeney, II et al. | 375/200 |
| 5,664,007 | * 9/1997 | Samadi et al. | 455/442 |
| 5,722,053 | * 2/1998 | Kornfeld et al. | 455/86 |
| 5,796,727 | * 8/1998 | Harrison et al. | 370/338 |
| 5,815,818 | * 9/1998 | Tanaka et al. | 455/522 |
| 5,828,661 | * 10/1998 | Weaver, Jr. et al. | 370/331 |
| 5,864,760 | * 1/1999 | Gilhousen et al. | 455/442 |
| 5,901,354 | * 5/1999 | Menich et al. | 455/442 |
| 5,937,019 | * 10/1999 | Padovani | 375/358 |
| 5,946,621 | * 8/1999 | Chheda et al. | 455/440 |

FOREIGN PATENT DOCUMENTS 952396  11/1996  (FI) .
95/12297  5/1995  (WO) .

* cited by examiner

*Primary Examiner*—Dwayne Bost
*Assistant Examiner*—Sonny Trinh
(74) *Attorney, Agent, or Firm*—Pillsbury Winthrop LLP Intellectual Property

(57) ABSTRACT

A cellular radio system and a handover method in a cellular radio system is provided. The cellular radio system includes a subscriber terminal and a base station. In the system, the subscriber terminal maintains and continuously updates an active set of base stations. One or several base stations belonging to the active set has a connection or connection set-up facilities to the subscriber terminal. The subscriber terminal controls the downlink transmission of one or several base stations of the active set by switching the transmission of the base station on or off. This method provides a fast soft handover similar to a hard handover.

37 Claims, 3 Drawing Sheets

HANDOVER METHOD, AND A CELLULAR RADIO SYSTEM

This application is the national phase of international application PCT/FI95/00467 filed Aug. 31, 1995 which designated the U.S.

BACKGROUND OF THE INVENTION

1. Field of the Invention

The invention relates to a handover method in a cellular radio system comprising at least one subscriber terminal and a base station, and in which system the subscriber terminal maintains and continuously updates an active set of base stations, one or several base stations belonging to the active set having a connection or connection set-up facilities to the subscriber terminal.

The invention also relates to a cellular radio system comprising at least one subscriber terminal and a base station, in which system the subscriber terminal maintains and continuously updates an active set of base stations, one or several base stations belonging to the active set having a connection or connection set-up facilities to the subscriber terminal.

2. Description of Related Art

When a subscriber terminal moves from one cell to another in a cellular radio system, a handover is performed, and this handover is either, in a simple case, a hard handover or a more flexible soft handover. The drawback of the hard handover is that the old connection is broken before a new one is set up. The problem is more marked especially in the ping-ponging effect wherein a channel keeps changing back and forth between different channels. This can be diminished by using a handover margin. However, the best base station connection cannot be utilized in such a case due to the handover margin and the delay of the handover procedure, wherefore an unnecessarily high transmit power must be used and the disturbance power of the system thereby increases.

The prior art soft handover also employs updating margins, which are covered, however, in the reception of the subscriber terminal by signals from base stations with better audibility. Furthermore, even these unnecessary signals increase the transmit power of the base stations and interfere with the other subscriber terminals. The prior art handover is described for example in Finnish Patent Application 952,396 (Granlund, Häkkinen, Hämäläinen): "Method for improving the reliability of handover and call establishment, and a cellular radio system", which is incorporated herein by reference.

As it is known, a pilot signal is used to identify a base station and to form an active set in the CDMA system. A pilot signal is a data-unmodulated spreading-coded signal, which is continuously transmitted by each base station to its coverage area. A terminal equipment can identify the base stations on the basis of the pilot signal, since the spreading codes of the pilot signals differ from one another.

Subscriber terminals continuously measure pilot signals. In order to reduce the measurement load of a terminal equipment in prior art systems, each terminal equipment maintains a measurement list of the base stations and the corresponding spreading codes of the pilot signals that are situated near the terminal equipment and that are possible candidates for handover or connection establishment. The base stations on the measurement list form a group of candidates, which may become members of the active set. It is possible to establish connections rapidly to the active set from the fixed network. Terminal equipments monitor with the highest priority the pilot signals of only those base stations that are on the measurement list.

When a terminal equipment moves, the measurement list must naturally be updated as the need arises. In the prior art systems updating is performed according to the measurement performed by the terminal equipment on the strength of the pilot signal, i.e. if a pilot transmitted by a base station is received with adequate strength, it is added to the measurement list.

A rake receiver used in particular in the CDMA system comprises several branches, each of which may be synchronized with a different signal component. The receiver can therefore receive several signals simultaneously. On the basis of the measurements of the pilot signal, the branches of the rake receiver are also caused to receive signals that arrive along different propagation paths. The rake receiver adapts to the attenuation changes over the different connections considerably faster than the active set is updated.

In a CDMA network providing many services there occur, however, situations wherein the load of the base station in the transmission direction from the terminal equipment to the base station, i.e. in the uplink transmission direction, is considerably greater than in the opposite transmission direction. An example of this is the unidirectional data transmission from the terminal equipment to the network. The prior art arrangements for updating the measurement list do not detect and therefore change the load of the base station in this transmission direction.

Even though the best signal can be selected and the power of signals which have propagated along different paths can be compiled when a rake receiver is used in the subscriber terminal, the number of the rake branches is limited by the power consumption and the manufacturing costs, and therefore the rake receiver cannot utilize, however, more than a few transmissions at a time.

Neither do the known systems provide the possibility of transferring connections to other base stations in a situation where an individual base station is overloaded.

SUMMARY OF THE INVENTION

The purpose of the present invention is to avoid the problems of the known arrangements and to implement a soft handover in the manner of hard handover with a very small effective handover margin, and to decrease the disturbance power of the base station when the subscriber terminal communicates with several base stations.

This is achieved with the method of the type described in the preamble, characterized in that the subscriber terminal controls the downlink transmission of one or several base stations of the active set in such a way that each base station switches its transmission on or off.

The cellular radio system according to the invention is characterized in that the subscriber terminal comprises means for controlling one or several base stations of the active set in such a way that each base station switches its downlink transmission on or off.

The invention provides considerable advantages. The number of signals transmitted by the base stations can be decreased, and the interference level caused by the base stations can thereby be reduced. This in turn increases the capacity of the system and improves the quality of the connections.

Handover also becomes faster. The updating of the active set is slow and requires a great deal of signalling. According to the invention, a base station can be activated by means of the internal signalling of the radio interface or alternatively by means of routed signalling. A mobile station has to keep active only 1 to 3 base stations providing the best connection, and to update this group rapidly by means of the signalling according to the invention. The result is a process, similar to a hard handover, from the base station to the terminal equipment with a very small effective handover margin.

The fixed network may operate in the same manner as in a conventional macro diversity system, and the arrangements according to the invention are only directed at the radio interface.

The invention enables the size of the active set and the selection margin to be increased without increasing the interference. This facilitates the maintenance of the best connection especially under difficult circumstances in a microcell environment.

BRIEF DESCRIPTION OF THE DRAWINGS

The invention will be described in greater detail below with reference to the examples according to the accompanying drawings, in which.

DETAILED DESCRIPTION OF THE PREFERRED EMBODIMENTS

Figure 1:
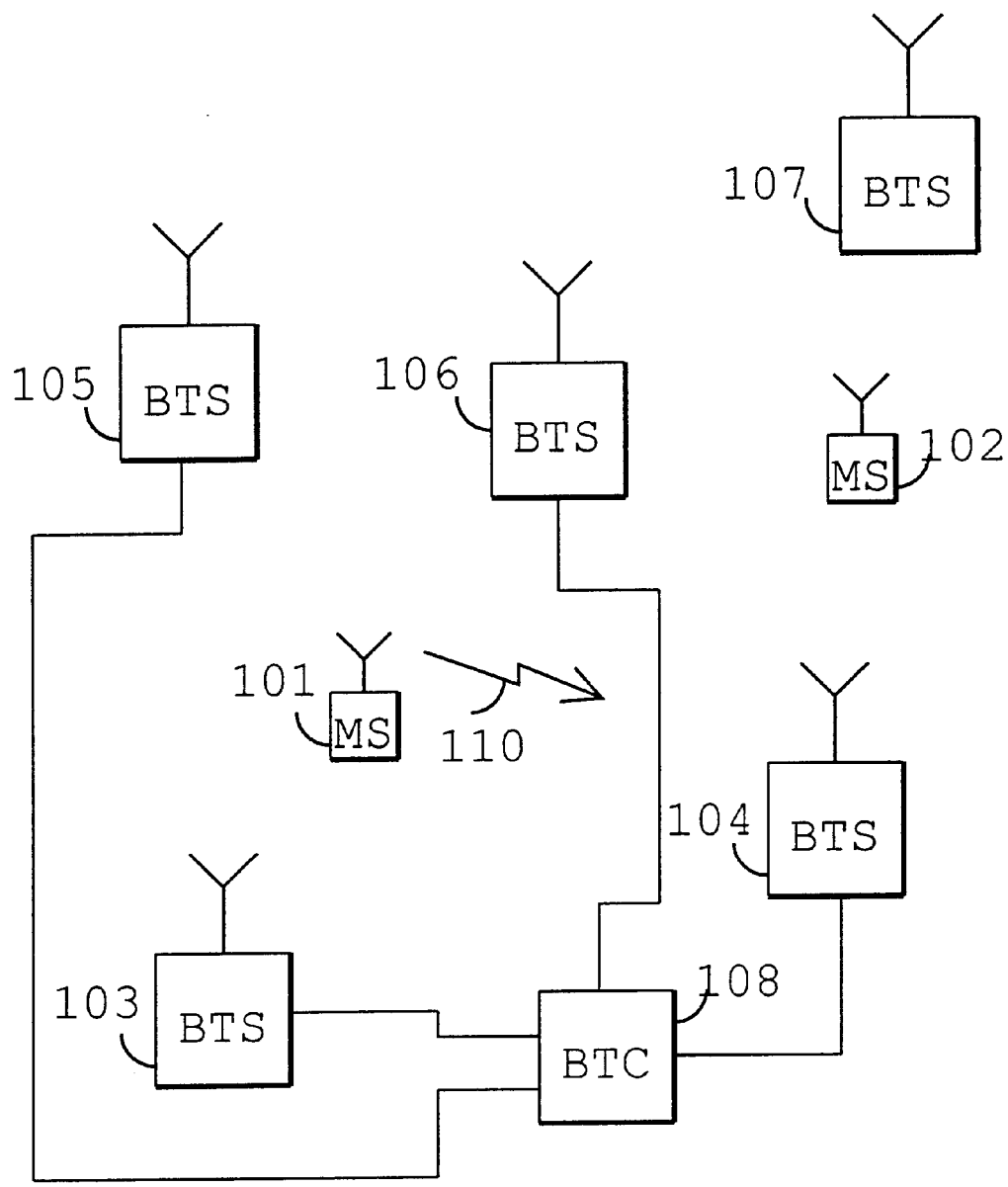
FIG. 1 shows a cellular radio system.

The method according to the invention will be described in greater detail below. In the method according to the invention, the selection of the macro diversity active set is based on the comparison of pilot signals, transmitted by the base stations, in the subscriber terminal. When the power of a pilot signal of a base station received at a subscriber terminal comes close to the power of the strongest received pilot signal within a certain margin, this base station is added to the active set of base stations maintained by the subscriber terminal. Otherwise the base station is removed from the active set when its signal deteriorates. The base stations of the active set are synchronized and receive the signal of the subscriber terminal if the signal-to-interference ratio enables it. Connections are established from the base stations through the fixed network, and through these connections the signals received by the base stations can be combined. The signal of the base stations of the active set to be transmitted to the subscriber terminal is transferred in a similar manner. The base stations of the active set have connections or at least connection set-up facilities to the subscriber terminals.

By means of measurements of signal quality, a subscriber terminal can change the transmission of the base stations. The subscriber terminal controls the downlink transmission of the base stations by switching the transmission on or off. For example, the subscriber terminal can decide to switch on or off the transmission of a base station actively and autonomously. The subscriber terminal transmits a command signal that orders at least one base station of the active set to switch its downlink transmission on or off. When the base station transmission is switched off in the arrangement according to the invention, the base station transmission is completely terminated or the transmit power is decreased by a desired degree, so that the interference caused by the base station disappears. The decrease in the transmit power can be for example between 40 dB and 3 dB. Switching a base station transmission on and off is preferably performed by means of a command signal, which can be received by the base station directly from the transmission of the subscriber terminal, or the command signal can be forwarded by the fixed network. Especially the command signal that switches on the base station transmission is either common to all the base stations of the active set, or it is separate for each base station, and this command signal is transmitted regularly, preferably at intervals of a frame. Transmitting the command signal regularly provides the advantage that the transmit power of the base stations can be adjusted at precise intervals, and when the interval between the adjustments is short, for example one frame, the adjustment is performed rapidly enough to observe even fast changes in the attenuation over the connection. All base stations receiving the command signal perform the power adjustment. The base stations which cannot receive the signal of the subscriber terminal observe the transmission error and terminate the transmission to this subscriber terminal. The transmission is terminated most preferably by decreasing the transmit power slowly within a predetermined period of time or by disconnecting the transmission after a predetermined delay. When the base station terminates the transmission after it has lost the connection, i.e. after the connection has deteriorated below a predetermined level, the advantage is that the number of the base stations communicating with the subscriber terminal can be restricted to the smallest possible. The base station starts retransmitting when it can receive the command signal of the subscriber terminal switching on the base station.

In another preferred embodiment of the invention, the subscriber terminal transmits a command signal by means of which the transmission of each base station of the active set is separately adjusted. Each of the base stations can separately receive the command signal, so that each base station adjusts its own transmit power according to what the command signal determines. The base stations that do not receive the control signal terminate the transmission to the subscriber terminal in the same manner as in the first preferred embodiment. The advantage of transmitting the command signal separately for each base station is that the method is then more controlled and the power level of each base station can be separately adjusted to the desired value. The command signal can also be assembled of signals received by several base stations. The control signal is then assembled in some part of the network, for example in the base station controller, and the control signals are signalled separately to each base station.

FIG. 1 is a diagram of a cellular radio system. The arrangement according to the invention is applicable in all interference-limited cellular radio systems, which include for example different spread spectrum systems, OFDMA systems, and in the preferred embodiment of the invention, the CDMA system. The cellular radio system comprises a number of subscriber terminals 101 and 102, and base stations 103 to 107. The subscriber terminals 101 and 102 communicate with the base stations 103 to 107 on certain traffic channels when the subscriber terminals are situated within the coverage area of the base stations. When the CDMA system is used, a traffic channel consists of a wide frequency band used by all terminal equipments 101 and 102 as they transmit to the base station 103 to 107 and also used by the base stations 103 to 107 in the downlink transmission direction. It is assumed in FIG. 1 that the subscriber terminal 101 communicates with the base stations 103 and 104, but that it is in the process of shifting the connection from the base station 104 to the base station 105, since the connection with the base station 104 deteriorates and the connection with the base station 105 is improved. The terminal equipment 101 transmits a command signal 110, which connects the base stations to transmit in the downlink transmission direction. In this example, the base stations 103, 104 and 105 form the active set of the subscriber terminal 101, since the quality of the connection to these base stations is better than the required signal noise level. Since the connection to the base station 105 is improving, which can be seen on the basis of the measurement on the pilot signal, the base station 105 then receives the control and continues the connection with the terminal equipment 101. The connection to the base station 104 deteriorates further and the base station finally loses the command signal 110. According to the arrangement of the invention, the base station then terminates the connection to the terminal equipment 101. The subscriber terminal may also transmit a command signal by means of which the downlink transmission of the base station is switched off. This command signal is preferably transmitted separately for each base station, so that not all the base stations of the active set terminate their transmission.

A base station controller 108 manages the control of the base stations 103 to 106 and assembles the signals arriving at the base stations 103 to 106 when the different parts of the signal have been received at different base stations. The base station controller 108 operates in this manner especially when, in an arrangement of the invention, the subscriber terminal 101 transmits the command signal 110 regulating the transmit power of the base stations in such a way that the different parts of the signal are received at different base stations. The base station controller 108 forwards the message of the command signal it has assembled via the fixed network 109 to the base stations 103 to 106, which operate according to the command of the control signal 110.

Figure 2:
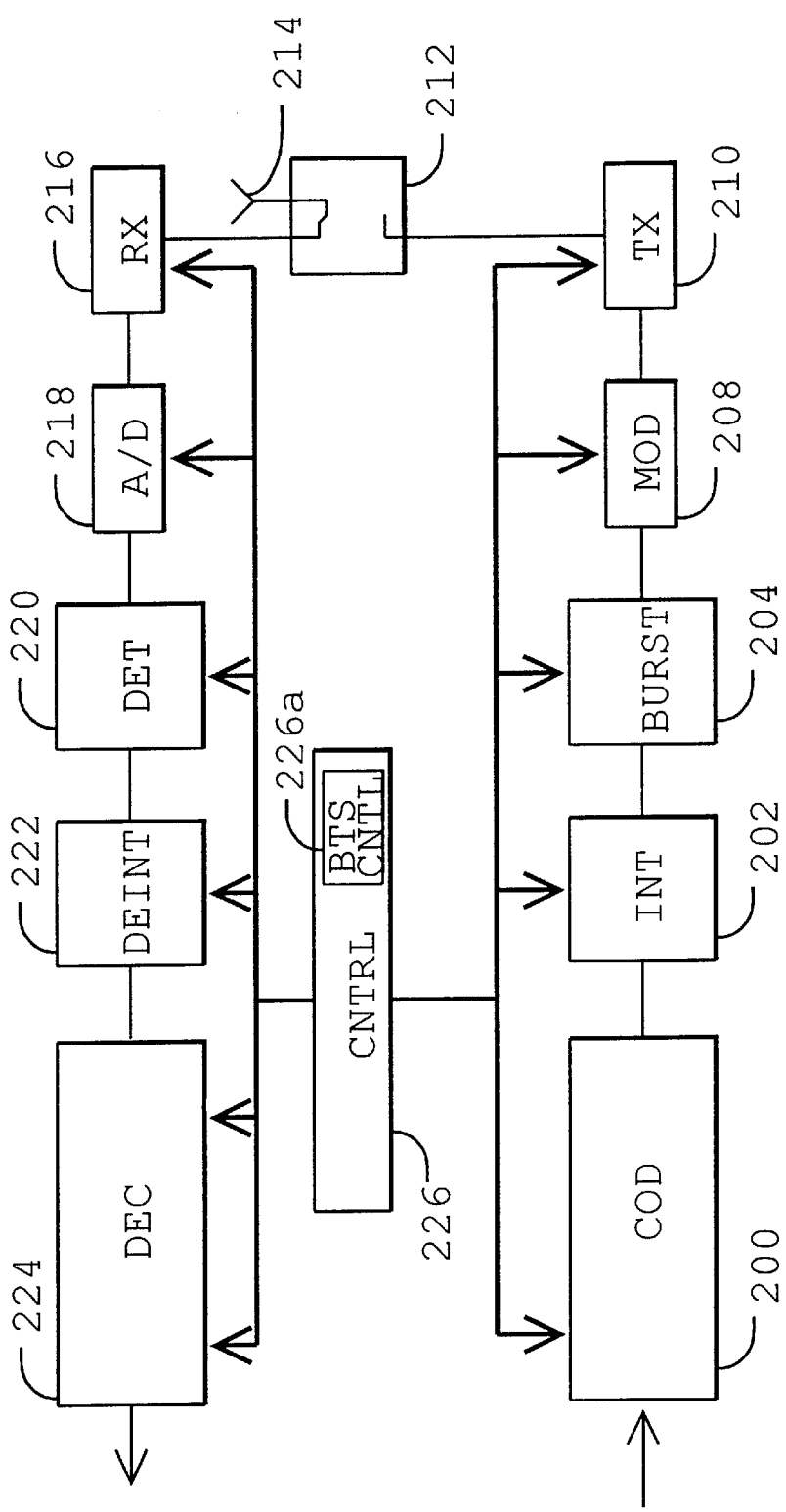
FIG. 2 shows the essential parts of a subscriber terminal.

FIG. 2 illustrates a transceiver of a subscriber terminal in the cellular radio system, the method according to the invention being applicable in such a transceiver. The receiving part of the subscriber terminal comprises a receiver unit 216 receiving a signal that is converted to an intermediate frequency, and converter means 218 in which the signal is converted to a digital form. The converted signal is supplied to detector means 220 from where the detected signal is supplied further to de-interleaving means 222 and to means 224 wherein the received signal is decoded, i.e. subjected to both channel and speech decoding.

The transmitting part of the subscriber terminal further comprises means 200 for encoding the signal to be transmitted. The encoded signal is supplied to means 202 for interleaving the encoded signal. The output signal of the interleaving means is connected to the input of the means 204, where the burst to be transmitted is formed. The resulting signal is supplied to modulation means 208, the output signal of which is supplied via a transmitter unit 210 and a duplex filter 212 to an antenna 214. The aforementioned blocks can be implemented in known manners.

The apparatus further comprises control and counting means 226, which control the operation of the other aforementioned blocks. The control means 226 may be used to adjust the transmit power of the subscriber terminal itself, i.e. the signalling and traffic channels of the subscriber terminal can be adjusted. In the arrangement according to the invention this concerns especially the command signal adjusting the transmit power of the base stations. When the power of the command signal is regulated, the number of the base stations situated within the coverage area of the subscriber terminal can be restricted. This provides the advantage that the subscriber terminal can keep active only 1 to 3 base stations providing the best connection, and update this group rapidly by means of signalling according to the invention. This results advantageously in operation similar to a hard handover in the downlink transmission direction with a very small effective handover margin. The control means 226 receive and compares signals from different base stations. On the basis of the comparison, means 226 decides whether to switch on or off a downlink transmission of at least one base station of the active set. Means 226a comprised by the command unit forms a command signal or control signals adjusting the transmit power of the base stations, the signal(s) being transmitted normally via the transmitting part. Adjusting the transmission of the base stations provides the advantage that the interference level caused by the base stations can be reduced, since the total transmit power of several base stations can be optimized to suit each situation. In the arrangement according to the invention, the transmission of the base stations is adjusted in such a way that the control signal switches the base station transmission on or off. When the base station transmission is disconnected, its transmit power is entirely switched off or the transmit power has been reduced by a certain amount, for example 20 dB. The advantage provided by this procedure is a fast handover. The control means 226 can also be used to adjust the transmit power of the terminal equipment itself, the advantage being that the number of the base stations with which the terminal equipment communicates can be restricted and the number of the interference signals can be simultaneously reduced. The control means 226 and 226a of the subscriber terminal are typically realized by means of a processor, but they may also be realized with several other kinds of electronic connections, which may perform similar functions as a processor. The subscriber terminal also comprises means 220, 226 for measuring the strength of a pilot signal it has received from a base station. If the system is a CDMA system, the detector block in the receivers, usually realized according to the rake principle, typically comprises several receiver branches at least one of which is a so-called searcher branch, which measures the strengths of the pilot signals.

Figure 3:
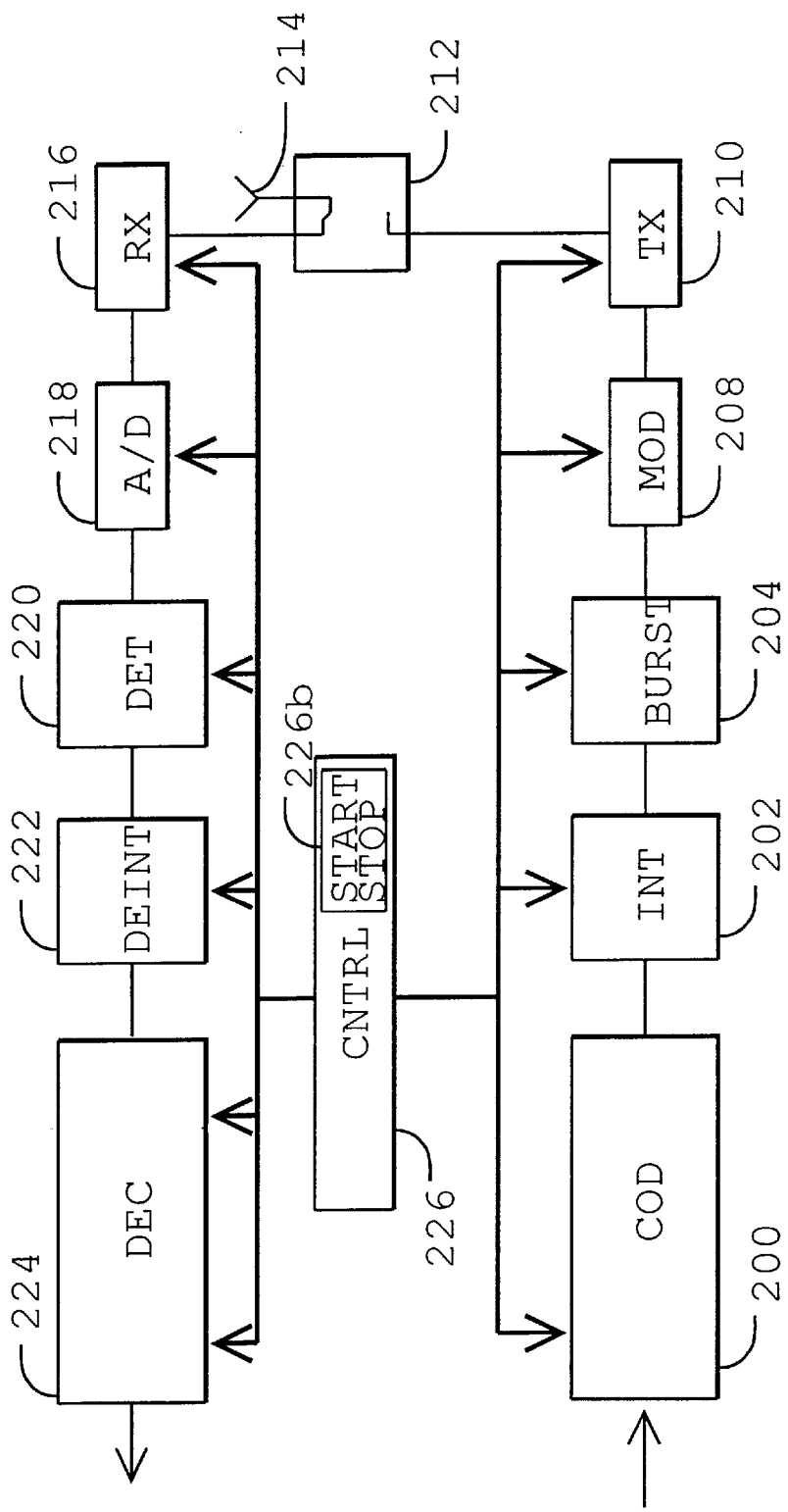
FIG. 3 shows the essential parts of a base station.

FIG. 3 is a diagram illustrating a transceiver of a base station. The transceiver of the base station is almost identical to the transceiver of the subscriber terminal. The transceiver of the cellular radio system according to the invention comprises means 220, 226 for estimating the attenuation over the connection between the terminal equipment and the base station by means of the received power of the pilot signal and the power used in the transmission. The transceiver of the base station further comprises means 220, 226 for estimating the signal-to-noise ratio of the uplink transmission direction on the basis of the total interference, the attenuation over the connection, and the transmit power of the terminal equipment. The base station equipment also comprises means 220, 226 for measuring the total interference of the signal it has received from the terminal equipments, and means 220 to 214, 226 for transmitting a pilot signal with known transmit power.

The greatest difference between the arrangement according to the invention and the prior art is in the control means 226. The control means 226 of the base station transceiver in the arrangement of the invention comprises means 226b for initiating a transmission to the subscriber terminal when the base station identifies the command signal of the subscriber terminal, and with the same means 226b the base station terminates the transmission to the subscriber terminal when the base station no longer identifies the command signal transmitted by the subscriber terminal to switch on the transmission, or when the base station receives a command signal by means of which the transmission is switched off. It is possible to terminate the transmission slowly with the means 226b and to avoid an immediate disconnection by reducing the transmit power of the base station within a predetermined delay. Terminating the transmission when the command signal is no longer clear reduces the number of the base stations communicating with a particular subscriber terminal, thus decreasing interference. Avoiding an immediate connection breakdown provides the advantage that the connection between the base station and the subscriber terminal is not lost due to a temporary deterioration in the signal-to-interference ratio. The control means 226 and 226b of the base station are typically realized by means of a processor, but they may also be realized with several other kinds of electronic connections, which may perform similar functions as a processor.

Even though the invention is described above with reference to the example according to the accompanying drawings, it is clear that the invention is not restricted thereto, but it can be modified in many ways according to the inventive idea disclosed in the appended claims.

What is claimed is:

1. A handover method in a cellular radio system including a subscriber terminal and a plurality of base stations, the method comprising:
    maintaining and continuously updating, by the subscriber terminal, an active set of the base stations, at least one of the base stations belonging to the active set having a respective connection to the subscriber terminal; and
    deciding, by the subscriber terminal, to switch on or off a respective downlink transmission of the at least one base station of the active set.

2. A method according to claim 1, wherein the subscriber terminal transmits a command signal ordering the at least one base station of the active set to switch on the respective downlink transmission.

3. A method according to claim 1, wherein the subscriber terminal transmits a command signal ordering the at least one base station of the active set to switch off the respective downlink transmission.

4. A method according to claim 1, wherein the subscriber terminal decides to switch on or off the respective downlink transmission of the at least one base station of the active set by controlling signaling and a traffic channel in such a way that the at least one base station of the active set loses the respective connection to the subscriber terminal, whereupon the at least one base station of the active set switches off the respective downlink transmission.

5. A method according to claim 1, wherein the at least one base station of the active set switches off the respective connection with the subscriber terminal after a predetermined delay.

6. A method according to claim 1, wherein the at least one base station of the active set switches off the respective connection with the subscriber terminal by reducing transmit power within a predetermined period of time.

7. A method according to claim 2, wherein the subscriber terminal transmits a command signal separately for each base station.

8. A method according to claim 2, wherein the command signal is common to all base stations of the active set.

9. A method according to claim 2, wherein the subscriber terminal transmits a command signal at regular intervals.

10. A method according to claim 9, wherein a transmission of traffic channels takes place at regular intervals in a form of frames and the subscriber terminal transmits the command signal at intervals of a frame.

11. A method according to claim 2, wherein when the command signal intended for the at least one base station of the active set is divided in fragments received by different base stations, the command signal intended for the at least one base station is assembled in a base station controller or in some part of the network from said fragments, and the command signal formed in this manner is signaled back to the at least one base station.

12. A cellular radio system comprising:
    a subscriber terminal; and
    a plurality of base stations, the subscriber terminal maintaining and continuously updating an active set of the base stations, at least one of the base stations belonging to the active set and having a connection to the subscriber terminal, wherein
    the subscriber terminal comprises:
        means for deciding to switch on or off a downlink transmission of at least one base station of the active set.

13. A cellular radio system according to claim 12, wherein the subscriber terminal comprises means for forming and transmitting a command signal ordering the at least one base station of the active set to switch on a transmission.

14. A cellular radio system according to claim 12, wherein the subscriber terminal comprises means for forming and transmitting a command signal ordering the at least one base station of the active set to switch off a transmission.

15. A cellular radio system according to claim 12, wherein the means for deciding to switch on or off downlink transmission of at least one base station of the active set is arranged to control signaling and traffic channels of the subscriber terminal in such a way that the at least one base station of the active set loses the connection to the subscriber terminal, and at least one of the base stations comprises means for switching off a respective downlink transmission when the at least one of the base station loses a respective connection to the subscriber terminal.

16. A cellular radio system according to claim 12, wherein the base stations, each comprise means for switching off a respective transmission after a predetermined delay.

17. A cellular radio system according to claim 12, wherein the base stations, each comprise means for switching off a respective transmission by reducing transmit power within a predetermined period of time.

18. A cellular radio system according to claim 13, wherein the subscriber terminal comprises means for transmitting a command signal separately for each of the base stations.

19. A cellular radio system according to claim 13, wherein the subscriber terminal comprises means for transmitting a command signal that is common to all of the base stations of the active set.

20. A cellular radio system according to claim 12, wherein the subscriber terminal comprises means for transmitting a command signal at regular intervals.

21. A cellular radio system according to claim 20, wherein transmission of traffic channels takes place at regular intervals in a form of frames and the subscriber terminal comprises means for transmitting a command signal at intervals of a frame.

22. A subscriber terminal for a cellular radio system, wherein the subscriber terminal comprises:
    means for maintaining and continually updating an active set of base stations; and
    means for deciding to switch on or off a respective downlink of at least one of the base stations of the active set.

23. The subscriber terminal according to claim 22, wherein said means for deciding to switch on or off a a respective downlink of at least one of the base stations of the active set comprises means for transmitting a command signal to order the at least one base station of the active set to switch on the respective downlink transmission.

24. The subscriber terminal according to claim 22, wherein said means for deciding to switch on or off a a respective downlink of at least one of the base stations of the active set comprises means for transmitting a command signal to order the at least one base station of the active set to switch off the respective downlink transmission.

25. The subscriber terminal according to claim 22, wherein said means for deciding to switch on or off a a respective downlink of at least one of the base stations of the active set comprises means for controlling signaling and a traffic channel such that the at least one base station of the active set loses a respective connection to the subscriber terminal and the at least one base station of the active set switches off the respective downlink transmission.

26. A method according to claim 3, wherein the at least one base station of the active set switches off the respective connection with the subscriber terminal after a predetermined delay.

27. A method according to claim 4, wherein the at least one base station of the active set switches off the respective connection with the subscriber terminal after a predetermined delay.

28. A method according to claim 3 wherein the at least one base station of the active set switches off the respective connection with the subscriber terminal by reducing transmit power within a predetermined period of time.

29. A method according to claim 4 wherein the at least one base station of the active set switches off the respective connection with the subscriber terminal by reducing transmit power within a predetermined period of time.

30. A method according to claim 3, wherein the subscriber terminal transmits a command signal separately for each base station.

31. A method according to claim 3, wherein when the command signal intended for the at least one base station of the active set is divided in fragments received by different base stations, the command signal intended for the at least one base station is assembled in a base station controller or in some part of the network from said fragments, and the command signal formed in this manner is signaled back to the at least one base station.

32. A cellular radio system according to claim 14, wherein the base stations, each comprise means for switching off a respective transmission after a predetermined delay.

33. A cellular radio system according to claim 15, wherein the base stations, each comprise means for switching off a respective transmission after a predetermined delay.

34. A cellular radio system according to claim 14, wherein the base stations, each comprise means for switching off a respective transmission by reducing transmit power within a predetermined period of time.

35. A cellular radio system according to claim 15, wherein the base stations, each comprise means for switching off a respective transmission by reducing transmit power within a predetermined period of time.

36. A cellular radio system according to claim 14, wherein the subscriber terminal comprises means for transmitting a command signal separately for each of the base stations.

37. A cellular radio system according to claim 14, wherein the subscriber terminal comprises means for transmitting a command signal that is common to all of the base stations of the active set.

* * * * *